(12) United States Patent
Cao et al.

(10) Patent No.: US 12,311,537 B2
(45) Date of Patent: May 27, 2025

(54) SEAL STRUCTURE FOR PROTECTING A MOTOR OF A ROBOT

(71) Applicant: ABB Schweiz AG, Baden (CH)

(72) Inventors: Xiaodong Cao, Shanghai (CN); Kaiwei Chen, Shanghai (CN); Jiajie Sha, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/006,819

(22) PCT Filed: Sep. 14, 2020

(86) PCT No.: PCT/CN2020/114996
§ 371 (c)(1),
(2) Date: Jan. 25, 2023

(87) PCT Pub. No.: WO2022/052089
PCT Pub. Date: Mar. 17, 2022

(65) Prior Publication Data
US 2023/0271338 A1 Aug. 31, 2023

(51) Int. Cl.
*F16H 57/029* (2012.01)
*B25J 9/10* (2006.01)
*B25J 9/12* (2006.01)
*B25J 19/00* (2006.01)
*H02K 5/10* (2006.01)
(Continued)

(52) U.S. Cl.
CPC ........... *B25J 19/0075* (2013.01); *B25J 9/102* (2013.01); *B25J 9/126* (2013.01); *F16H 57/029* (2013.01); *H02K 5/10* (2013.01); *H02K 7/003* (2013.01); *F16H 2057/02034* (2013.01)

(58) Field of Classification Search
CPC ........ B25J 9/003; B25J 9/0045; B25J 9/0021; B25J 9/126; B25J 9/102; B25J 19/0075; F16H 2057/02034; F16H 57/029; H02K 5/10; H02K 7/003
USPC ......................................... 74/490.01, 490.03
See application file for complete search history.

(56) References Cited

U.S. PATENT DOCUMENTS

2019/0305618 A1   10/2019   Mizukoshi

FOREIGN PATENT DOCUMENTS

| CN | 104514797 A | 4/2015 |
| CN | 206738573 U | 12/2017 |
| CN | 208474454 U | 2/2019 |

(Continued)

OTHER PUBLICATIONS

International Search Report and Written Opinion; Issued by ISA/CN National Intellectual Property Administration; regarding corresponding patent application Serial No. PCT/CN2020/114996; dated Jun. 10, 2021; 9 pages.

*Primary Examiner* — T. Scott Fix
(74) *Attorney, Agent, or Firm* — Greenberg Traurig, LLP

(57) ABSTRACT

According to implementations of the subject matter described herein, there is provided a robot. The robot includes a motor mounted on a frame; a driving member having a shaft portion mounted to the motor and an output portion configured to engage a downstream driving member; a seal ring coupled to the frame and having an inner annular portion; and a collar secured to the shaft portion and having an outside peripheral surface in contact with the inner annular portion of the seal ring. A robot having a more reliable seal for protecting the motor can be achieved.

20 Claims, 3 Drawing Sheets

(51) Int. Cl.
*H02K 7/00* (2006.01)
*F16H 57/02* (2012.01)

(56) References Cited

FOREIGN PATENT DOCUMENTS

| | | | | |
|---|---|---|---|---|
| CN | 208738952 | U | 4/2019 | |
| CN | 111571635 | A | 8/2020 | |
| CN | 211231527 | U | 8/2020 | |
| DE | 4134553 | A1 * | 3/1992 | |
| DE | 10319991 | A1 * | 12/2003 | ........... F16H 57/025 |
| DE | 10256752 | B3 * | 1/2004 | ........... F16H 57/021 |
| JP | H07151212 | A | 6/1995 | |
| JP | H1026218 | A | 1/1998 | |
| JP | 2015075125 | A * | 4/2015 | ............ F16C 19/548 |
| JP | 2015116072 | A | 6/2015 | |
| JP | 2020090898 | A | 6/2020 | |
| RO | 101982 | A | 8/1991 | |
| RO | 101982 | B1 | 3/1992 | |
| WO | WO-2019052666 | A1 * | 3/2019 | |

* cited by examiner

SEAL STRUCTURE FOR PROTECTING A MOTOR OF A ROBOT

CROSS-REFERENCE TO RELATED APPLICATIONS

This is a national stage application claiming priority to International patent application Serial No.: PCT/CN2020/114996, filed on Sep. 14, 2020; which is herein incorporated by reference in its entirety.

FIELD

Embodiments of the present disclosure generally relate to a robot. In particular, a robot having a seal structure for protecting a motor is provided.

BACKGROUND

A robot is a machine capable of performing tasks automatically or according to instructions. The robot may be a parallel link robot or jointed arm robot. A movement of each link or joint is actuated by a driving module comprising a motor and a speed reducer. The speed reducer is often filled with lubricating oil to lubricate gears arranged therein. Generally, the speed reducer is connected to the motor directly and they are closely positioned, which means that the lubricating oil leaking out from the speed reducer may reach the motor. It is desired to protect the motor from contaminants, especially the leaked lubricating oil. Although a housing of the motor is usually provided with a seal, an accumulation of the contaminants, especially the lubricating oil, on the motor is not desirable as it may raise a risk of a failure of the motor.

An additional seal structure may be arranged between the motor and the speed reducer so as to protect the motor. A traditional seal structure needs an extra flange to hold a seal ring, thereby creating a contact seal between the seal ring and an output shaft of the motor or a shaft of a pinion connected to the motor. In this case, the height of the output shaft of the motor or the height of the pinion will be high, and the assembly process of the robot is complex and time-consuming. Therefore, there is a need for an improved robot having an improved seal structure for protecting the motor.

SUMMARY

According to implementations of the subject matter described herein, there is provided an improved robot having an improved seal structure for protecting the motor.

According to embodiments of the present disclosure, there is provided a robot. The robot comprises: a motor mounted on a frame; a driving member comprising a shaft portion mounted to the motor and an output portion configured to engage a downstream driving member; a seal ring coupled to the frame and comprising an inner annular portion; and a collar secured to the shaft portion and comprising an outside peripheral surface in contact with the inner annular portion of the seal ring.

In some embodiments, the collar comprises a mounting portion for mounting the shaft portion, and a length of the mounting portion along a longitudinal axis of the collar is below a length of the outside peripheral surface along the longitudinal axis of the collar.

In some embodiments, the collar comprises a radial ring mounted to the shaft portion and an axial ring extending from the radial ring towards the motor along the longitudinal axis of the collar, and wherein the outside peripheral surface is a part of the axial ring.

In some embodiments, the shaft portion of the driving member comprises: a first portion for mounting the mounting portion, and a second portion mounted to the motor.

In some embodiments, the first portion is press fitted into the mounting portion, or glued to the mounting portion.

In some embodiments, the first portion and the mounting portion each comprise a circumferential surface.

In some embodiments, the first portion and the mounting portion each comprise a conical surface.

In some embodiments, the second portion is press fitted into an output hole of the motor, and the driving member comprises a through hole extending along a longitudinal axis of the driving member.

In some embodiments, the output portion comprises a gear, a pulley or a chain wheel.

In some embodiments, an outer diameter of the collar is larger than an outer diameter of the output portion.

The Summary introduces a selection of concepts in a simplified form that are further described below in the Detailed Description. The Summary is not intended to identify key features or essential features of the subject matter described herein, nor is it intended to be used to limit the scope of the subject matter described herein.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference symbols refer to the same or similar elements.

DETAILED DESCRIPTION OF IMPLEMENTATIONS

Principles of the subject matter described herein will now be described with reference to some example implementations. It should be understood that these implementations are described only for the purpose of illustration and to help those skilled in the art to better understand and thus implement the subject matter described herein, without suggesting any limitations to the scope of the subject matter disclosed herein.

As used herein, the term "based on" is to be read as "based at least in part on." The terms "an implementation" and "one implementation" are to be read as "at least one implementation." The term "another implementation" is to be read as "at least one other implementation." The term "first," "second," and the like may refer to different or the same objects. Other definitions, either explicit or implicit, may be included below.

It should be further understood that the terms "comprises", "comprising", "has", "having", "includes" and/or "including", when used herein, specify the presence of stated features, elements, and/or components, etc., but do not preclude the presence or addition of one or more other features, elements, components and/or combinations thereof.

The robot is a machine capable of performing tasks automatically or according to instructions. It is desired to prevent a motor of the robot from contaminants, such as lubricating oil of a speed reducer connected to the motor.

An additional seal structure may be provided between the motor and the speed reducer. However, traditional seal structures need an extra flange to hold a seal ring. In this case, the height of the output shaft of the motor or the height of the pinion will be high, and the assembly process of the robot is complex and time-consuming.

Figure 1:
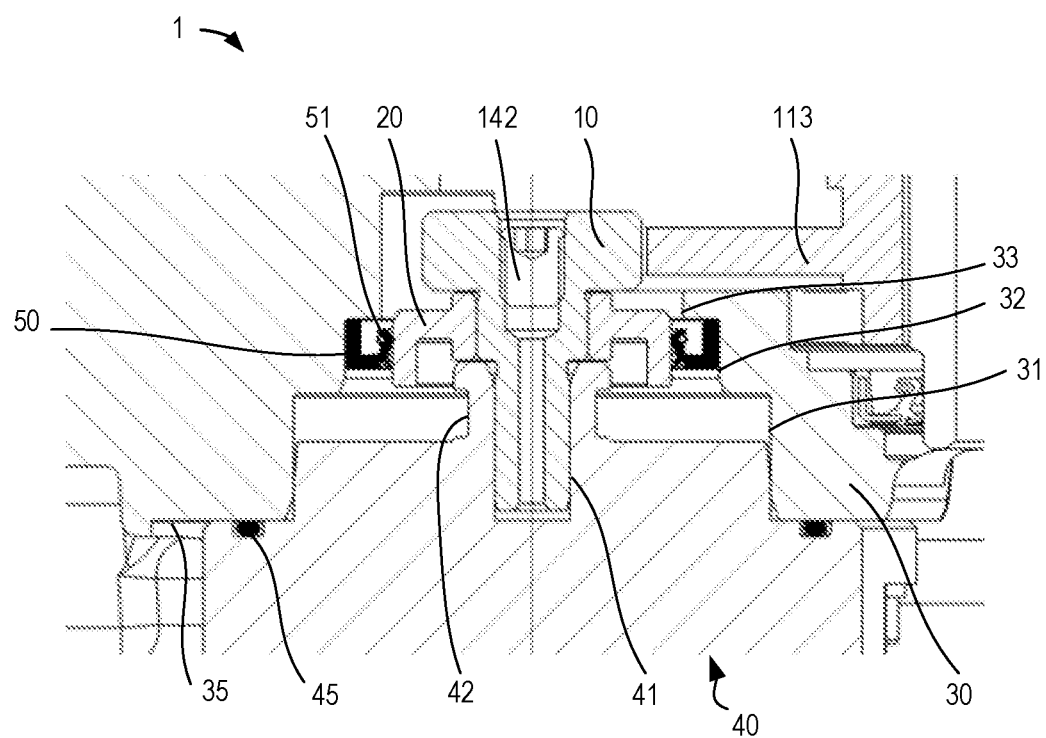
FIG. 1 schematically represents a cross sectional view of a part of a robot according to some embodiments of the present disclosure.

In order to at least solve the above problem and other potential problems, embodiments of the present disclosure provide an improved seal structure for protecting the motor, and a related robot comprising the seal structure. FIG. 1 illustrates a cross sectional view of a part of a robot according to some embodiments of the present disclosure.

The robot 1 may be a parallel link robot or a jointed arm robot. A cross sectional view of a part of the robot 1, such as a joint of the robot 1, is shown in FIG. 1. The robot 1 comprises a motor 40, a driving member 10, a seal ring 50 and a collar 20. In some embodiments, the motor 40 and the seal ring 50 may be mounted to a frame 30 of the robot 1. The frame 30 may be a casing of a joint of the robot 1 or a base of the robot 1.

In some embodiments, the frame 30 may comprise an opening for receiving the motor 40 and the seal ring 50. The opening may comprise a planar surface 35 for contacting a main portion of the motor 40, and a seal 45 may be positioned between the main portion of the motor 40 and the planar surface 35 of the frame 30. The opening may further comprise a first step hole 31 for receiving a first protrusion of the motor 40, a second step hole 32 for receiving the seal ring 50, and a third step hole through which the driving member 10 passes.

In some embodiments, a speed reducer may be provided to transmit the rotation of the motor 40 to a movement of the robot 1, such as a movement of the joint of the robot 1. As shown in FIG. 1, the speed reducer may comprise a downstream driving member 113 for engaging with the driving member 10.

The driving member 10 comprises a shaft portion 120 and an output portion 110.

Figure 2:
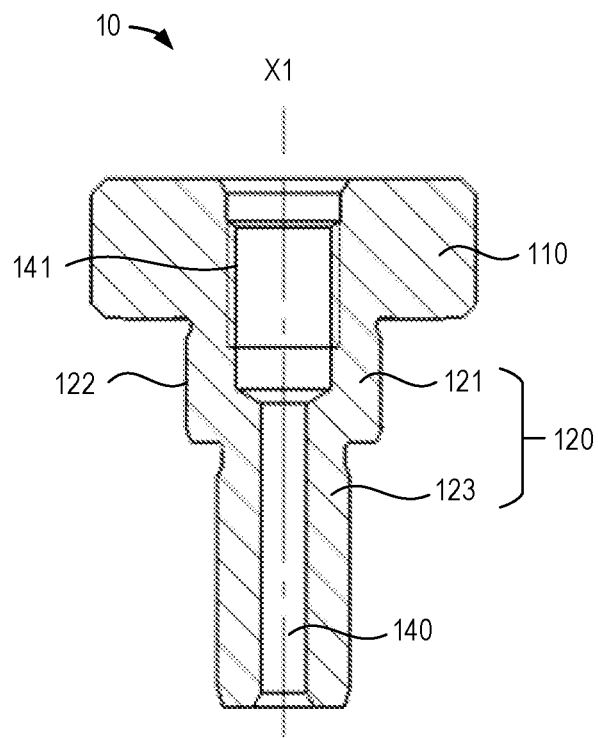
FIG. 2 schematically represents a cross sectional view of a driving member of the robot according to some embodiments of the present disclosure.

FIG. 2 illustrates a cross sectional view of the driving member 10 of the robot 1. The shaft portion 120 of the driving member 10 is configured to be mounted to the motor 40. In some embodiments, the shaft portion 120 may comprise a first portion 121 for mounting a mounting portion 215 of the collar 20 and a second portion 123 for mounting the motor 40.

In some embodiments, the first portion 121 of the shaft portion 120 may be press fitted into the mounting portion 215 of the collar 20. In other embodiments, the first portion 121 of the shaft portion 120 may be glued to the mounting portion 215 of the collar 20.

In some embodiments, the first portion 121 and the mounting portion 215 may comprise a surface 122 and a surface 215-1, respectively. The surface 122 may be fixedly connected to the surface 215-1 by press fitting or gluing. In some embodiments, the surface 122 and the surface 215-1 each comprise a circumferential surface. In other embodiments, the surface 122 and the surface 215-1 each comprise a conical surface. With the surfaces 122 and 215-1, the first portion 121 and the mounting portion 215 may be fixedly connected together. As such, the collar 20 may rotate together with the driving member 10.

In some embodiments, the second portion 123 of the shaft portion 120 may be press fitted into an output hole 41 of the motor 40. The driving member 10 may comprise a through hole 140 which extends along a longitudinal axis X1 of the driving member 10. The through hole 140 may function as an air escape hole when the second portion 123 is being press fitted into the output hole 41. Alternatively, or in addition, the motor 40 may further comprise a neck portion 42 for receiving the second portion 123 to enhance the connection strength between the motor 40 and the driving member 10.

In other embodiments, the second portion 123 of the shaft portion 120 may be connected into the output hole 41 of the motor 40 by a key (not shown). A recess may be provided in the second portion 123 for receiving a part of the key, and a corresponding recess may be provided in the output hole 41 for receiving another part of the key. As such, the rotation of the motor 40 may be transmitted to the second portion 123 (and thus to the driving member 10) via the key.

It should be understood that the second portion 123 may be connected to the output hole 41 in other manners, such as by gluing.

In some embodiments, the output portion 110 of the driving member 10 may comprise a gear, a pulley or a chain wheel. It should be understood that the output portion 110 may include other mechanisms that can drive the downstream driving member 113 of the speed reducer.

As shown in FIG. 1, the seal ring 50 comprises an inner annular portion 51. In some embodiments, the seal ring 50 may be an O-type ring.

With reference to FIG. 1, the collar 20 is secured to the shaft portion 120, and for example to the first portion 121. The collar 20 comprises an outside peripheral surface 231 which is configured to be in contact with the inner annular portion 51 of the seal ring 50. As such, a seal is formed between the collar 20 and the seal ring 50, thereby isolating the motor 40 from potential contamination. That is, the motor 40 may be protected against a failure caused by leakage of the lubricating oil from the speed reducer.

With the collar 20, the height of the driving member 10 may be reduced, thereby reducing an influence of a bending moment to the motor 40 caused by a radial force exerting on the driving member 10. Moreover, since the outside peripheral surface 231 is arranged on the collar 20, the area of the outside peripheral surface 231 contacting the seal ring 50 may be increased such that a more reliable seal may be formed between the seal ring 50 and the collar 20. In addition, compared with a conventional driving member, the moment of inertia of the driving member 10 may be reduced by using the collar 20 to contact the seal ring 50.

Figure 3:
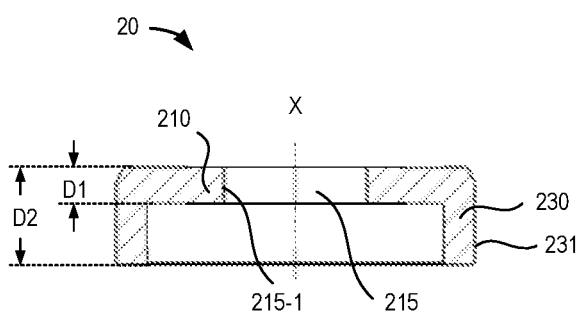
FIG. 3 schematically represents a cross sectional view of a collar of the robot according to some embodiments of the present disclosure.
Figure 4:
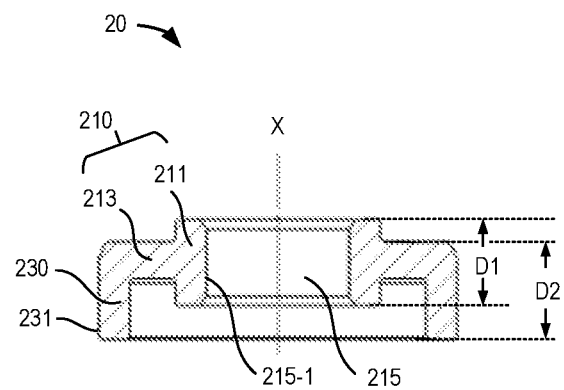
FIG. 4 schematically represents a cross sectional view of a further collar of the robot according to some embodiments of the present disclosure.

FIGS. 3-4 schematically represent a cross sectional view of a collar 20 of the robot 1 according to some embodiments of the present disclosure, respectively. In some embodiments, the collar 20 comprises the mounting portion 215 for mounting the shaft portion 120. For example, the mounting portion 215 may be a hole extending along a longitudinal axis X of the collar 20.

In some embodiments, as shown in FIGS. 3-4, a length D1 of the mounting portion 215 along the longitudinal axis X of the collar 20 is below a length D2 of the outside peripheral surface 231 along the longitudinal axis X of the collar 20. As such, a length of the surface 122 of the driving member 10 along the longitudinal axis X1 required to mount the collar 20 can be reduced, which means that the height of the driving member 10 may be reduced. In addition, the area of the outside peripheral surface 231 of the collar 20 for contacting the seal ring 50 can be increased without being restricted by the driving member 10. Thus, a more reliable seal may be formed between the seal ring 50 and the collar 20.

In some embodiments, as shown in FIGS. 3-4, the collar 20 may comprise a radial ring 210 and an axial ring 230. The radial ring 210 is configured to be mounted to the shaft portion 120. Specifically, the radial ring 210 comprises the mounting portion 215 configured to be mounted to the first portion 121 of the driving member 10.

In some embodiments, the radial ring 210 may comprise a first radial ring 211 and a second radial ring 213, as shown in FIG. 4. A length of the first radial ring 211 along the longitudinal axis X is longer than a length of the second radial ring 213 along the longitudinal axis X. This may have the benefit of reducing the weight of the collar 20. In addition, this has the benefit of a more reliable connection between the first radial ring 211 and the first portion 121 of the driving member 10.

The axial ring 230 extends from the radial ring 210 towards the motor 40 along the longitudinal axis X of the collar 20 when the collar 20 is mounted to the driving member 10, as shown in FIG. 3. As shown in FIG. 4, the axial ring 230 extends from the second radial ring 213 along the longitudinal axis X of the collar 20.

By using the collar 20, the outside peripheral surface 231 is a part of the axial ring 230 such that the area of the outside peripheral surface 231 for contacting the seal ring 50 may be increased significantly.

In some embodiments, an outer diameter of the collar 20 is larger than an outer diameter of the output portion 110. As such, the assembly process of the robot 1 can be simplified.

Figure 5:
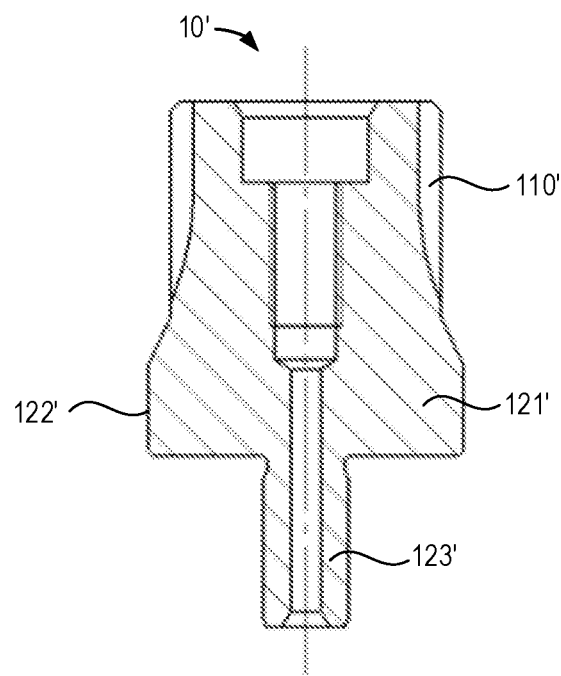
FIG. 5 schematically represents a cross sectional view of a further driving member of the robot according to some embodiments of the present disclosure.

FIG. 5 schematically represents a cross sectional view of a further driving member 10' of the robot 1 according to embodiments of the present disclosure.

In this case, the driving member 10' is manufactured integrally and comprises an output portion 110', a first portion 121' including an outside peripheral surface 122' for contacting the seal ring 50, and a second portion 123' for mounting the motor 40.

According to some embodiments of the present disclosure, an assembly process of the robot 1 may be provided.

The driving member 10 and the collar 20 may be secured together by press fitting or gluing. For example, the first portion 121 of the driving member 10 may be press fitted into, or glued to, the mounting portion 215 of the collar 20.

Then, the shaft portion 120 of the driving member 10 may be connected to the motor 40, for example to the output hole 41 of the motor 40, via a key. Alternatively, the shaft portion 120 may be glued to, or press fitted into the output hole 41. As such, a motor assembly comprising the motor 40, the driving member 10 and the collar 20 is formed.

The seal ring 50 may be coupled to the frame 30, such as to the second hole 32 of the frame 30.

The motor assembly may then be mounted to the frame 30. In the assembly state, the motor 40 is secured to the frame 30, and the output portion 110 engages with the downstream driving member 113. At the same time, the outside peripheral surface 231 of the collar 20 contacts the inner annular portion 51 of the seal ring 50.

Therefore, a seal structure for protecting the motor 40 is provided, and a failure of the motor 40 caused by the leakage of the lubricating oil of the speed reducer is thus avoided. Moreover, the assembly process of the robot 1 is simplified. With the collar 20, a more reliable seal for protecting the motor 40 can be achieved.

While operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:
1. A robot comprising:
  a frame comprising:
    a planar surface, and
    a step hole,
      wherein the frame comprises at least one of a casing of a joint of the robot or a base of the robot;
  a motor mounted to the frame,
    wherein the motor contacts the planar surface of the frame, and the motor comprises a first protrusion positioned in the step hole;
  a driving member comprising a shaft portion mounted to the motor at the first protrusion and an output portion configured to engage a downstream driving member;
  a seal ring coupled to the frame and comprising an inner annular portion; and
  a collar comprising:
    an outside peripheral surface in contact with the inner annular portion of the seal ring,
      wherein the outside peripheral surface of the collar being in contact with the inner annular portion of the seal ring is configured to reduce a moment of inertia of the driving member, and
    a mounting portion,
      wherein the shaft portion of the driving member is mounted to the mounting portion of the collar to secure the collar to the shaft portion.

2. The robot of claim 1,
wherein a length (D1) of the mounting portion along a longitudinal axis (X) of the collar is less than a length (D2) of the outside peripheral surface along the longitudinal axis (X) of the collar.

3. The robot of claim 2, wherein the collar comprises:
a radial ring mounted to the shaft portion, and
an axial ring extending from the radial ring towards the motor along the longitudinal axis (X) of the collar, and wherein the outside peripheral surface is a part of the axial ring.

4. The robot of claim 2, wherein the shaft portion of the driving member comprises:
a first portion for mounting the mounting portion, and
a second portion mounted to the motor.

5. The robot of claim 4, wherein the first portion is press fitted into the mounting portion or glued to the mounting portion.

6. The robot of claim 5, wherein the first portion and the mounting portion each comprise a circumferential surface.

7. The robot of claim 5, wherein the first portion and the mounting portion each comprise a conical surface.

8. The robot of claim 7, wherein the second portion is press fitted into an output hole of the motor, and
wherein the driving member comprises a through hole extending along a longitudinal axis (X1) of the driving member.

9. The robot of claim 1, wherein the output portion comprises a gear, a pulley, or a chain wheel.

10. The robot of claim 1, wherein an outer diameter of the collar is larger than an outer diameter of the output portion.

11. The robot of claim 2, wherein the output portion comprises a gear, a pulley, or a chain wheel.

12. The robot of claim 2, wherein an outer diameter of the collar is larger than an outer diameter of the output portion.

13. The robot of claim 3, wherein the output portion comprises a gear, a pulley, or a chain wheel.

14. The robot of claim 3, wherein an outer diameter of the collar is larger than an outer diameter of the output portion.

15. The robot of claim 6, wherein the output portion comprises a gear, a pulley, or a chain wheel.

16. The robot of claim 6, wherein an outer diameter of the collar is larger than an outer diameter of the output portion.

17. The robot of claim 7, wherein the output portion comprises a gear, a pulley, or a chain wheel.

18. The robot of claim 7, wherein an outer diameter of the collar is larger than an outer diameter of the output portion.

19. The robot of claim 8, wherein the output portion comprises a gear, a pulley, or a chain wheel.

20. The robot of claim 3, wherein the radial ring of the collar comprises:
a first radial ring portion, and
a second radial ring portion,
wherein a length of the first radial ring portion along the longitudinal axis (X) is longer than a length of the second radial ring portion along the longitudinal axis (X),
wherein the first radial ring portion defines a surface of the mounting portion.

\* \* \* \* \*